United States Patent [19]
Geipel et al.

[11] Patent Number: 4,606,370
[45] Date of Patent: Aug. 19, 1986

[54] FLOW-SWITCHING WATER-MIXING FAUCET ASSEMBLY

[75] Inventors: Werner Geipel, Iserlohn; Bruno Heimann, Fröndenberg-Ardey; Vinzenz Grendel, Hemer, all of Fed. Rep. of Germany

[73] Assignee: Friedrich Grohe Armaturenfabrik GmbH & Co., Hemer, Fed. Rep. of Germany

[21] Appl. No.: 692,036

[22] Filed: Jan. 16, 1985

[30] Foreign Application Priority Data

Jan. 17, 1984 [DE] Fed. Rep. of Germany ....... 3401352

[51] Int. Cl.4 ........................................... G05D 11/00
[52] U.S. Cl. .................................... 137/119; 137/359; 137/467; 137/801
[58] Field of Search ................ 137/119, 359, 467, 801

[56] References Cited
U.S. PATENT DOCUMENTS 2,206,609  7/1940  Klein ................................. 137/467
2,507,467  5/1950  Fredrickson .................. 137/467 UX
2,986,158  5/1961  Gratzmuller ...................... 137/467
3,086,748  4/1963  Reinemann ...................... 137/119
3,192,952  7/1965  Botnick ........................ 137/359 X
3,746,031  7/1973  Christiansen ................ 137/467 X Primary Examiner—Harold W. Weakley
Attorney, Agent, or Firm—Karl F. Ross; Herbert Dubno

[57] ABSTRACT

An operating mechanism for a fluid flow shifting valve of a sanitary mixing faucet assembly or the like of, for example, a bathtub and shower, which raises or lowers a flow shifting valve stem guided in the mixing faucet body so as to shift the fluid flow between two outlets, comprises an operating lever pivotally connected to the valve stem and also attached pivotally to a preferably rodlike, centrally located pivot bearing, wherein the lever arm of the operating lever is proportioned so that a reduced applied force is sufficient to effect a shift in fluid flow. Advantageously the operating lever may be provided with a press contact or a lever cap attached to its top for ease of operation. The operating mechanism is essentially integrated in the mixing faucet body so that it does not protrude significantly.

15 Claims, 8 Drawing Figures

FLOW-SWITCHING WATER-MIXING FAUCET ASSEMBLY

FIELD OF THE INVENTION

Our present invention relates to a fluid flow shifting valve of a mixing faucet assembly for a bathtub and shower or the like, and more particularly to an improved operating mechanism for a water flow shifting valve having a shifting valve stem guided in the mixing faucet body for shifting the water outflow from one outlet to another, for example between a bathtub or basin spout and a shower.

BACKGROUND OF THE INVENTION

Similar types of fluid flow control mechanisms are known, for example from German Pat. No. DE-PS 27 39 196, wherein as a rule the mechanism will be operated by a push or pull on a shifting valve member by a handle positioned above the shifting valve stem. In some cases it is detrimental to have a handle which protrudes significantly from the faucet body and also requires a comparatively high applied force for operation.

OBJECTS OF THE INVENTION

It is the principal object of the invention to provide an operating mechanism for a fluid flow shifting valve, especially in a bathtub and shower assembly, that does not protrude significantly from the mixing faucet body and can effectively be operated by a reduced applied force.

It is another object of our invention to provide a flow shifting water-mixing faucet assembly of a bathtub and shower or the like which is effectively operated by a reduced applied force.

It is a further object of this invention to provide an operating mechanism for a fluid flow shifting valve for a mixing faucet assembly of a bathtub and shower or the like which does not protrude from the mixing faucet body thus affording improved safety.

It is also an object of this invention to provide a manual operating mechanism for a fluid flow shifting valve which does not protrude from the casing of the shifting valve and is operable with a comparatively small applied force.

SUMMARY OF THE INVENTION

These objects and others which will be apparent hereinafter are attained in accordance with the invention in an operating mechanism of a fluid flow shifting valve for a mixing faucet assembly, wherein the shifting valve stem is movable in the mixing faucet body between two positions, a first shifting valve stem position in which fluid mixed in the mixing chamber of the mixing faucet assembly flows through the shifting valve into a first outlet, for example a shower outlet, and a second shifting valve stem position in which fluid mixed in the mixing chamber of the mixing faucet flows through the shifting valve into a second outlet, for example a bathtub basin outlet.

The shifting valve operating mechanism comprises an externally accessible operating lever connected rotatably to the fluid flow shifting valve stem and attached pivotally to a preferably rodlike, centrally located pivot bearing, wherein the lever arm of the operating lever is so proportioned that a reduced applied force is required to operate the shifting valve. When the operating lever is pivoted, the shifting valve stem is raised or lowered so as to shift fluid flow accordingly.

Advantageously the operating lever may be coupled to the shifting valve stem by means of a head piece snapped onto the upper part of the valve stem having a transverse rod attached, preferably perpendicularly to the valve stem. The transverse rod of the head piece is engaged in a jaw or jaws formed in the operating lever, the distance from the jaws to the pivot bearing being the effective lever arm of the operating lever.

Since the operating lever is operated manually, it can comprise press contacts or the like attached to the upper surface of a substantially planar support lever.

In a preferred embodiment the operating lever comprises a lever cap attached to a support lever. The lever cap has a roof shaped portion rearwardly of the pivot bearing which protrudes from the mixing faucet body, while the portion of the lever cap forward of the pivot bearing is substantially flush with the mixing faucet body. The forward direction is by definition the direction from the pivot bearing toward the shifting valve stem along the body of the operating lever). The lever cap may advantageously be provided with side walls which embrace and grip the support lever. The support lever may be provided with a forward prong in the preferred embodiment which engages in a slot in the forward portion of the lever cap. Thus the lever cap is united with the support lever to form the operating lever and acts as a hand contact for pivoting the operating lever.

The operating lever is advantageously supported in a box-like, rectangular cross sectioned lever case. The lever case has a front side wall adjacent the shifting valve stem and a rear side wall with a substantial opening therein and also is substantially open on top so as to be able to receive and hold the operating lever without preventing pivoting. The lever case is supported in a cavity of similar dimensions in the mixing faucet body.

The support lever is advantageously attached pivotally to the rodlike pivot bearing by a snap coupling. The snap coupling is locked in place by a rectangular strap in the preferred embodiment. The rectangular strap is inserted through the open, rear side wall of the lever case, through a guide passage positioned directly below the support lever and immediately below the pivot bearing to engage in a hole or indentation in the lower portion of the support lever adjacent the snap coupling.

The advantages of this invention are achieved because the structure of the operating lever of the operating mechanism for the shifting valve is largely integrated into the mixing faucet body. This eliminates unsafe, possibly unattractive, protrusions from the faucet body while providing for a fluid flow shift only when pressure is applied to the appropriate portion of the operating lever. By a suitable proportioning of the operating lever the applied force required to effect a shift in fluid flow is reduced significantly from that required in prior art devices. Thus a small child can easily operate the shift valve safely and correctly.

BRIEF DESCRIPTION OF THE DRAWING

The above and other objects, features and advantages of the invention will become more readily apparent from the following detailed description, reference being made to the accompanying drawing, in which.

SPECIFIC DESCRIPTION

Figure 1:
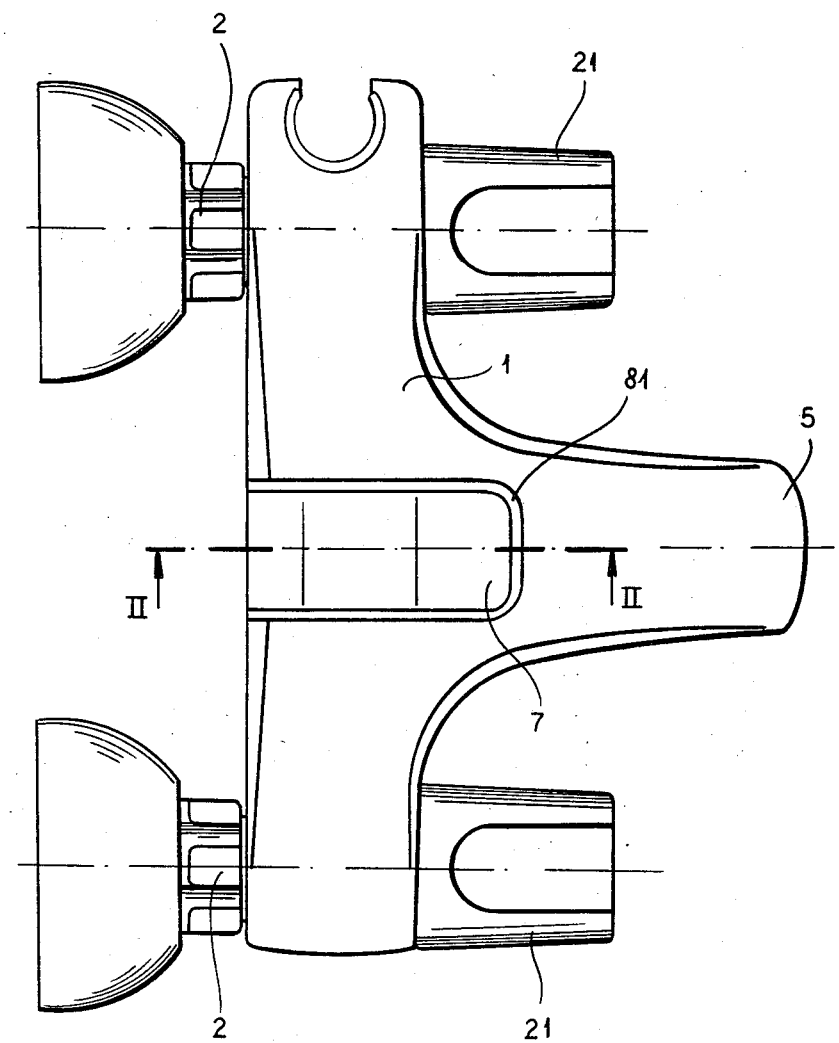
FIG. 1 is a top view of a mixing faucet assembly for a bathtub and shower showing the exterior of the operating lever of this invention.

The mixing faucet assembly shown in the drawing comprises a faucet body 1, fluid flow connectors 2, for example for cold and warm water, cold and warm water metering faucets each with faucet valve handles 21, a shower outlet 4, a bathtub spout 5 and fluid flow shifting valve 6, as well as the operating lever 7 of this invention. In this preferred embodiment flowing warm and cold water will therefore be mixed in a mixing chamber 3 constructed in the mixing faucet body 1 to form a water mixture having a temperature between that of the cold and the warm water supplied. The hot and cold water valves are conventional and have thus not been further disclosed.

Figure 2:
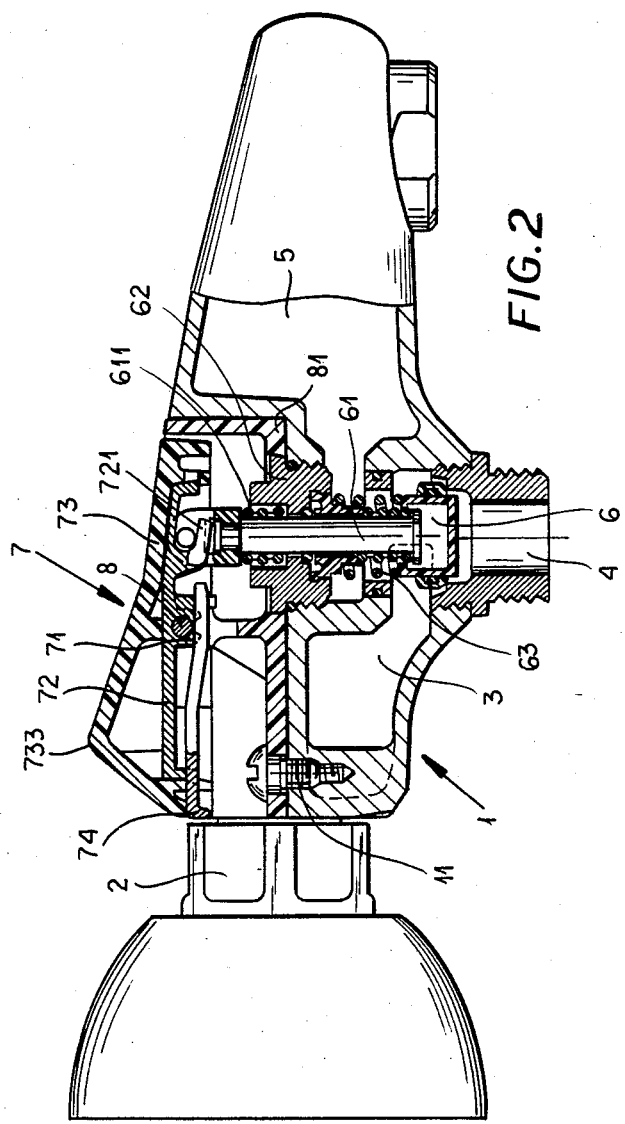
FIG. 2 is a partially vertical cross sectional, partial side view of the mixing faucet assembly taken along the central line II—II of FIG. 1.

In FIG. 2 the shifting valve 6 is shown in a position in which the mixed water flows from mixing chamber 3 through shifting valve 6 into the tub spout 5. The shifting valve 6 can shut off the tub spout 5 by an upward axial motion of the shifting valve stem 61 and thereby open up the shower outlet 4 for water flow.

The shifting valve 6 will be held upwardly in this position during the showering process by the water pressure head, while the shift valve stem 61 which slides in the shifting valve 6 itself will be guided back into a neutral position by the restoring spring 611.

When the water supply is shut off with the faucet valve handles 21, the water pressure head drops and a restoring spring 63 brings the shifting valve 6 back into its lower position, that is the position in which water flows into the bath outlet spout 5.

Should a shift into bath outlet flow be desired during the showering process, the water pressure head can, of course, be overcome by lowering the shift valve stem which forces the slidable shift valve 6 down shifting the water flow.

The shifting valve with an upper shifting valve housing 62 is screwed into the faucet body 1. At its upper protruding end a head piece 613 is snapped onto the shifting valve stem 61. The head piece 613 has perpendicular to the valve stem 61 a transverse rod 612 attached and preferably penetrating therethrough. The shift valve stem is movable up and down by the pivoted support lever 72 in which the transverse rod 612 is rotatably engaged but not rigidly attached.

In an upper cavity of the faucet body 1 a boxlike, rectangular cross sectioned lever case 81 open at its rear side wall is inserted and held in place in a faucet body 1 with the aid of the shifting valve upper housing 62.

In the lever case 81 a horizontally oriented, preferably rod shaped, pivot bearing 8 is positioned, preferably centrally. A support lever 72 is pivotally attached to pivot bearing 8 by a snap coupling 71 and the support lever 72 is coupled to the head piece 613 of the shifting valve stem 61 by means of a pair of opposed parallel jaws 721 engaging each end transverse rod 612. On the support lever 72 a preferably tonguelike lever cap 73 is positioned which covers the support lever 72 and embraces the upper portion of support lever 72 with downwardly directed side walls.

In the vicinity of the jaws 721 the support lever 72 has a protruding prong 722, which is engaged in a slot 731 of the lever cap 73, and at the opposite end of the support lever 72 vertically positioned snap clasp 732 of the lever cap 73 grips a vertical lower portion of the support lever 72 and thus both pieces are solidly bound to each other to form operating lever 7.

Figure 3:
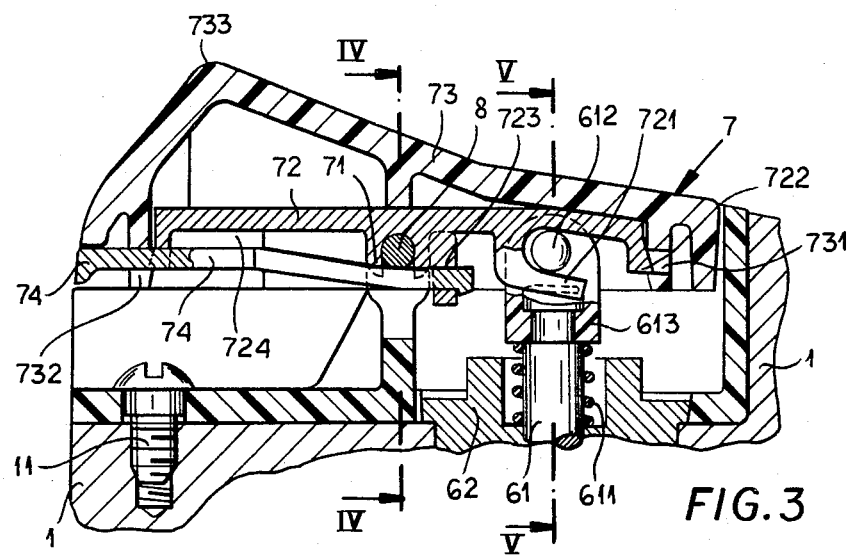
FIG. 3 is a partial vertical cross sectional view to a larger scale showing the novel shifting valve operating mechanism according to the embodiment shown in FIG. 2.
Figure 4:
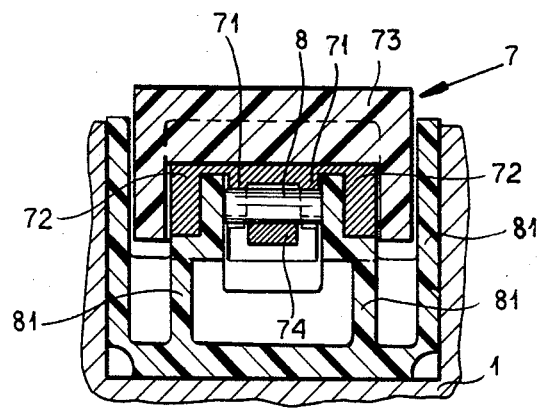
FIG. 4 is a cross sectional view of the operating mechanism taken along the line IV—IV of FIG. 3.
Figure 5:
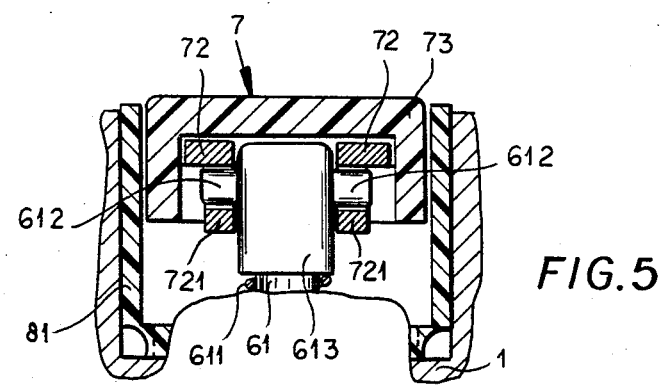
FIG. 5 is another vertical cross sectional view of the operating mechanism taken along the line V—V of FIG. 3.
Figure 6:
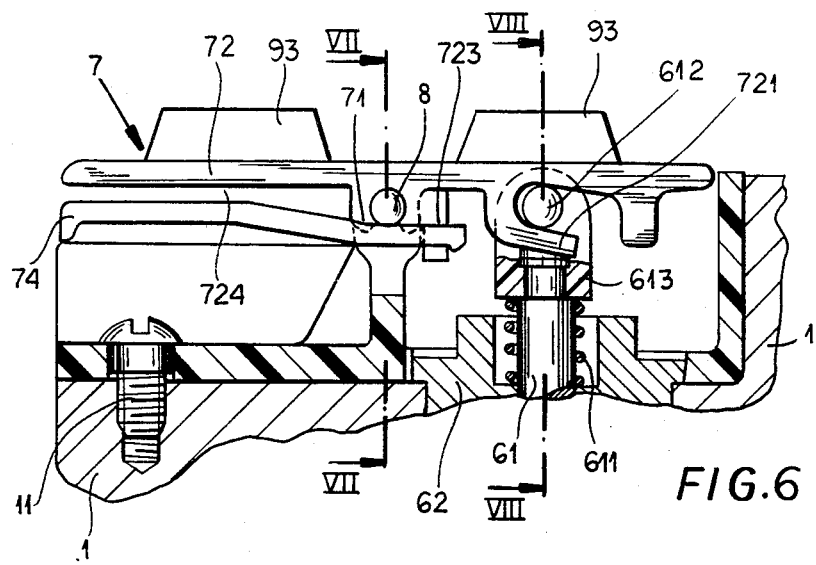
FIG. 6 is a magnified partial vertical cross sectional view showing a second embodiment of the novel shifting valve operating mechanism having press contacts instead of an operating cap.
Figure 7:
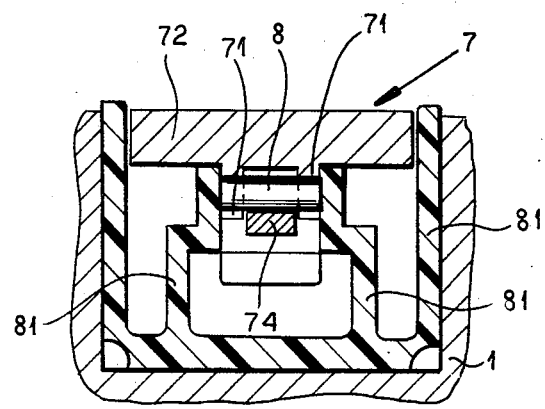
FIG. 7 is a cross section taken along the line VII—VII of FIG. 6.
Figure 8:
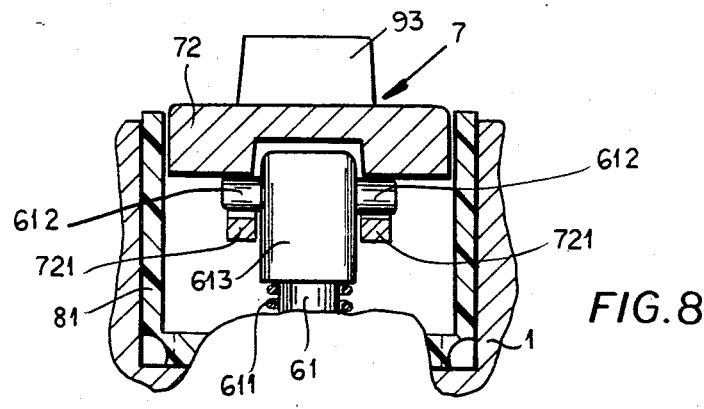
FIG. 8 is a cross section taken along the line VIII—VIII of FIG. 6.

For securing the snap coupling 71 on the pivot bearing 8 a strap 74 is inserted from the open rear side of the lever case 81 through the nearly horizontal guide passage 724 and directly below the snap coupling 71 into a corresponding opening or indentation 723 in the downwardly extending support lever 72, whereby a locking of the snap coupling 72 is effected as can best be seen in FIGS. 3 and 4. For further securing the operating members of this mechanism the lever case 81 is also attached with a screw 11 to the faucet body 1.

As is particularly evident from FIG. 2, the operating members of this shifting valve operating mechanism are essentially integrated in the faucet body 1 of the mixing faucet assembly. Only the lever cap 73 projects slightly out from the upper surface of the faucet body 1 with its rooflike operating pad 733 positioned rearwardly of pivot bearing 8. If this preferred operating pad 733 is pressed by hand, the operating lever 7 will be pushed down into the faucet body 1 rearwardly of the pivot bearing 8 and lifts the shifting valve 6 with jaws 721 from its valve seat so that now the shower outlet will be open and the water pressure head permits the shifting valve to remain in this position.

After the operating pressure on the operating lever 7 is removed, the restoring spring 611 pulls the shifting valve stem 61 back again into its neutral position. Should during the showering it be desired to switch the flow to the bath outlet, thus it is only required to bring a corresponding pressure on the area of the operating lever 7 forward of the pivot bearing 8 and the shifting valve 6 will conduct the water again to the bath outlet spout 5. After each operation, therefore, the operating lever 7 is reset into its neutral position.

In a second embodiment the lever cap 73 is replaced by a pair of press contacts 93 as shown in FIGS. 6 to 9. The structure and operation of this embodiment is identical to that of the first embodiment except for differences in the shape of the support lever 72 in the vicinity of a fork forming jaws 721 and at its rear portion. The support lever 72 and the press contacts 93 together comprise the operating lever 7. The press contacts 93 are advantageously disk shaped and may be rounded or smoothed according to the designer's desire.

When the press contact 93 rearwardly to the pivot bearing 8 is pressed, the support lever 72 is depressed in the vicinity of the pressed press contact 93 and is rotated to raise the shifting valve stem 61 so that water flows from the shower outlet. But when the press contact 93 forward of the pivot 8 is pressed, the valve stem 61 is forced down and the valve 6 as well so that water flows from the tub outlet spout.

We claim:

1. In an operating mechanism for a fluid flow shifting valve of a sanitary mixing faucet assembly and the like of a bathtub and shower or the like, which operates a shifting valve stem guided in the mixing valve body so as to shift the water flow between the bathtub and the shower at will, the improvement wherein said valve stem is pivotally connected to an operating lever which is also pivotally attached to a pivot bearing, and the lever arms of said operating lever are so proportioned that a reduced applied force is required to operate said flow shifting valve, said pivot bearing being disposed in a boxshaped, rectangular cross section lever case having a front side wall adjacent said shifting valve stem and an opposing rear side wall with a substantial rear wall opening therein, said lever case having a top opening extending over substantially the entire top of said case, said lever case being fastened in a cavity conformed to hold said lever case in said faucet body of said mixing faucet assembly, and said pivotable operating lever is rotatably attached to said pivot bearing by a snap coupling, wherein said top opening of said lever case is substantially covered by said operating lever.

2. The improvement defined in claim 1 wherein said lever case is supported in part by a shifting valve upper housing in said cavity of said faucet body.

3. The improvement defined in claim 2 wherein said operating lever comprises a support lever to which said snap coupling is attached and at least one press contact attached to the upper surface of said support lever, said support lever having at least one jaw formed therein for pivotal connection to said shifting valve stem.

4. The improvement defined in claim 1 wherein said operating lever comprises a support lever to which said snap coupling is attached and a lever cap attached to and substantially covering said support lever, said support lever having at least one fork formed therein for pivotal connection to said shifting valve stem.

5. The improvement defined in claim 4 wherein said support lever is embraced and held by a pair of opposing side walls of said lever cap, wherein at least one protruding prong is formed in the front end of said support lever adjacent said fork, said prong fastening in a slot of said lever cap, and said supporting lever has a downwardly directed snap clasp at the rear end opposite to said prong, said snap clasp gripping under said support lever, and thereby unites both said lever cap and said support lever.

6. The improvement defined in claim 5 wherein said snap coupling is locked by means of a strap inserted through said open, rear side wall of said lever case, held in a guide passage directly below said support lever and said pivot bearing and further held by said support lever below said snap coupling.

7. The improvement defined in claim 4 wherein said lever cap is rooflike in shape and protrudes from said lever casing rearwardly of said pivot bearing while at the same time being substantially in said lever casing.

8. The improvement defined in claim 4 wherein said support lever has two parallel opposing jaws which engage and pivotally hold opposing ends of said transverse rod of said head piece snapped on said shifting valve stem so as to convert a rotation of said support lever into a vertical displacement of said shifting valve.

9. A flow-switching water-mixing valve for a sanitary fixture, comprising:

a valve housing having an elongated support, a pair of valve members in said housing for controlling hot and cold water flow, respectively, and a shower outlet;

a valve stem shiftable in said housing in a direction generally perpendicular to said spout for directing a mixture of water at a temperature determined by said valve members selectively to said spout and to said shower outlet; and a lever pivotal on said housing about a fulcrum defined by said housing with an axis perpendicular to that of said stem, said lever being coupled with said stem for shifting of said stem thereby, said lever having lever arms proportioned to enable actuation of said valve stem by rocking of said lever with low force, said housing being formed with an upwardly open cavity, said fulcrum being defined by a pin mounted upon a member fitting into said cavity and opening in a direction opposite that in which said spout extends.

10. The valve defined in claim 9 wherein said member is anchored in said cavity at least in part by a bushing threaded into said housing and guiding said stem.

11. The valve defined in claim 10 wherein said lever is snap fitted onto said pin and has a fork pivotally engaging said stem.

12. The valve defined in claim 11 wherein said lever is provided with a retaining tongue engaging beneath said pin and spanned at opposite ends against said lever.

13. The valve defined in claim 12, further comprising a cap connected to said lever and covering said cavity.

14. The valve defined in claim 13 wherein said cap has a roof-shaped projection rearwarly of said fulcrum with respect to said spout.

15. The valve defined in claim 14 wherein said cap has a portion parallel to said spout between said fulcrum and said spout.

* * * * *